United States Patent [19]

Goldmann et al.

[11] Patent Number: 5,740,331
[45] Date of Patent: Apr. 14, 1998

[54] SYSTEM AND PROCESS FOR CONVERTING IMAGE INFORMATION

[75] Inventors: Gerd Goldmann, München; Markus Löbel, Schwaben, both of Germany

[73] Assignee: Oce Printing Systems GmbH, Poing, Germany

[21] Appl. No.: 596,299

[22] PCT Filed: Aug. 9, 1994

[86] PCT No.: PCT/DE94/00919

§ 371 Date: Feb. 13, 1996

§ 102(e) Date: Feb. 13, 1996

[87] PCT Pub. No.: WO95/05643

PCT Pub. Date: Feb. 23, 1995

[30] Foreign Application Priority Data

Aug. 19, 1993 [DE] Germany ............... 43 27 967.8

[51] Int. Cl.⁶ .................................................. G06K 15/00
[52] U.S. Cl. .................... 395/108; 395/109; 395/114; 395/115; 395/101; 358/448
[58] Field of Search .............................. 395/108, 107, 395/109, 114, 101, 115, 116; 347/249, 247; 358/401, 448; 382/54

[56] References Cited

U.S. PATENT DOCUMENTS

| | | |
|---|---|---|
| 4,251,821 | 2/1981 | Kimura .................. 347/249 |
| 4,396,928 | 8/1983 | Abe et al. .............. 347/247 |
| 4,584,573 | 4/1986 | Ito ........................ 395/108 |
| 4,635,081 | 1/1987 | Wiedemer ............. 347/247 |
| 4,700,201 | 10/1987 | Sato ...................... 347/249 |
| 5,282,057 | 1/1994 | Mailloux et al. ...... 358/445 |

FOREIGN PATENT DOCUMENTS

| | | |
|---|---|---|
| 0 246 457 A2 | 11/1987 | European Pat. Off. . |
| 0 403 476 B1 | 12/1990 | European Pat. Off. . |
| 29 41 667 A1 | 4/1980 | Germany . |

Primary Examiner—Dwayne Bost
Assistant Examiner—Tracy M. Legree
Attorney, Agent, or Firm—Hill, Steadman & Simpson

[57] ABSTRACT

Image information suitable for positive image generation and present in matrix form is transferred from a data processing device (1) to a converting device (5). The converting device (5) contains a storage device (2) accommodating at least two image lines (m) and an OR logic combining means (3). The latter, in order to generate image information suitable for inverse image generation of a pixel (P), logically combines the image information suitable for positive image generation of this pixel (P) with at least one further such item of image information of an adjacent pixel (P). The generated pixels (P) are output by the converting device (5) to an image reproduction device (4).

9 Claims, 3 Drawing Sheets

SYSTEM AND PROCESS FOR CONVERTING IMAGE INFORMATION

BACKGROUND OF THE INVENTION

The invention relates to a system and a process for converting image information in matrix form and suitable for positive image generation into image information suitable for inverse image generation for an electrographic printer or copier.

European reference EP 0 403 476 B1 discloses an optical character generator for an electrophotographic printer, using which printing information present in the form of electronic data is converted into an optical image. The optical image is then transmitted to a photoconductive layer, for example a continuously circulating charge storage drum of the printer, by means of exposure, in order to generate a latent charge image. This charge image is developed in a known way and transfer printed, for example on paper.

Advantageous for this application are optical character generators which expose the charge storage drum line by line over its complete length, since the exposure process, in contrast to exposure by means of a laser, can then be carried out without mechanical movement. Such a line by line construction of the optical character generator requires a dedicated light source for each imaging point within one line. Light-emitting diodes are preferably used as light sources, since these components offer the possibility of a very compact arrangement.

In the case of the known character generator, the pixels of the matrix are exposed by means of the light-emitting diodes on the charge storage drum, on which pixels toner particles are intended to be deposited during the image development. The pixel is therefore identical to the toner point. The point diameter of an exposed pixel is determined by the focusing of the light-emitting diode, that is to say by its cone of light incident on the photoconductive layer.

The pixels are arranged at a defined spacing from one another. The spacing between two pixels is defined as the grid size. In the case of the prior art, the point diameter is greater than the grid size. For this reason, in the case of the exposure of two adjacent pixels, overlapping of the toner points occurs. This overlapping leads to improved representation of the image to be reproduced. The ratio of the point diameter to the grid size is defined as the degree of overlap. The degree of overlap commonly lies in the range between 1.4 and 2.

Apart from this first development method, as is used in the case of the cited prior art, that is to say the inking of the discharged areas (=DAD Discharged Area Development), there is a second development method: the inking of the charged areas (=CAD Charged Area Development).

Whereas, in the case of the first development method, the discharged surface areas of the photosensitive layer correspond to the information to be printed, in the case of the second development method the charged surface area corresponds to the information to be printed. In order to provide the precondition for this second development method, the background of the information to be printed is exposed on the photosensitive layer. This exposure can be carried out, as in the case of the first development method, optionally by means of a laser beam, a laser diode beam, a line of light-emitting diodes or the like.

Since the first-named development method is normally used in electrographic printers or copiers, there are for this process on the market a corresponding number of partially standardized character sets in the form of so-called "bit maps". A bit map designates a defined matrix in which, to generate a character or an image, specific pixels are set in a binary fashion.

Such bit maps are disclosed, for example, by U.S. Pat. No. 4,635,081. The individual character elements to be represented are stored in a memory in character fields (bit maps) of equal size in the form of binary characters. A character field for one character of a size $1/10 \times 1/6$ inch has 18 columns and 24 lines and hence 432 points of intersection. Each point of intersection, which corresponds to a pixel, is allocated one digital memory location.

It has now been shown that, for the purpose of inverse image generation, a simple converting of the image information for positive image generation into image information for inverse image generation, that is to say by setting the not-set pixels of a matrix and resetting the set pixels of the matrix, a satisfactory image reproduction is not possible. For example, thin lines are imaged only poorly or even not at all.

This occurs because of the above-described overlapping of the cones of light incident on the photosensitive layer. Since the diameters of the cones of light are greater than the grid size of the matrix, only very small charged areas remain on the photosensitive layer. The line intensity which can be achieved by means of simple inversion can be determined in accordance with the relationship $$\text{Line intensity}_{inverse} = \text{Line intensity}_{positive} - (\text{Grid size} \times (\text{Overlap factor} - 1))$$

In the case of a correspondingly large degree of overlap, a character with a 1-point line intensity may even disappear.

Since simple inversion of the normal bit maps consequently does not lead to the desired success, character sets have been specially developed for inverse image generation. During the development, it was attempted by means of manual setting of individual pixels of the bit map matrices to obtain the same visual impression of the characters and graphics as are achieved in the case of normal image generation. Depending on which image generation process is used, a special character set must consequently be provided. It is therefore necessary for two different character sets to be available to achieve the same image reproduction result.

SUMMARY OF THE INVENTION

The invention is therefore based on the object of indicating a system and a process for converting image information in matrix form and suitable for positive image generation into image information suitable for inverse image generation for an electrographic printer or copier, using which system and process special character sets for inverse image generation can be dispensed with.

In general terms the present invention is a system having a data processing device that is coupled to a converting device, the converting device has a storage device for storing at least two consecutive lines of the image information suitable for positive image generation. The converting device also has a logic combining means which is coupled to the storage device and logically ORs the image information suitable for positive image generation of a pixel with at least one further such item of image information of an adjacent pixel in order to generate an item of image information suitable for inverse image generation of the pixel. The converting device is coupled to an image reproduction device.

The present invention is also a process in which a data processing device transmits image information suitable for positive image generation to a storage device contained in a converting device. A logic combining means, which is coupled to the storage device and contained in the converting device, reads the image information suitable for positive image generation of a pixel and at least one further such item of image information of an adjacent pixel from the storage device. The logic combining means ORs these items of image information in order to generate an item of image information suitable for inverse image generation of the pixel. The converting device outputs the generated image information to an image reproduction device.

The image information, processed by a data processing device, is transmitted—before its transmission to an image reproduction device—into a storage device of a converting device. In the storage device, it is always possible to store at least so many successive lines of the image information suitable for positive image generation that the image information necessary for inverse image generation is available. The storage device is coupled to an OR logic combining means. The OR logic combining means has random access to the memory cells needed for the inverse image generation. The result of the logic combination, that is to say the generated image information, is output by the converting device to the image reproduction device.

According to the solution according to the invention, in addition to the image information which is set for positive image generation at specific pixels of a matrix, further image information is set of pixels which are located directly adjacent to the said pixels. This leads to such a broadening of line intensities and toner points of a character or of a graphic that an inversely generated printed image has at least the same image quality as a printed image generated by the positive method.

Using the OR logic combining means, a single-stage Boolean computational process for generating the image information is possible. This computational process can be carried out in terms of software by a program or in terms of hardware, for example, with the aid of an ASIC, in a rapid manner.

The user of an electrographic printer or copier has to keep only one character set ready for the two types of image generation. Externally, the electrographic printers or copiers, operating according to the different image generation methods, behave identically.

According to a development and refinement of the invention, a character generator is provided as image reproduction device (4), which has at least one controllable light source by means of which the generated image information can be transmitted onto the surface of a photosensitive layer. The diameter of the light beam incident on the photosensitive layer can be set such that it is greater than the spacing of two pixels from each other. By changing the diameter of the light beam, the degree of overlap can be set. A degree of overlap between 1.4 and 2 is normal. By changing the degree of overlap—even beyond the normal limits—the printed image can be optimized.

According to a first variant, in order to generate the image information of a pixel in the column (n) and the line (m), the image information suitable for positive image generation of four directly adjacent pixels, forming a rectangle, is fed to the OR logic combining means to be logically combined. If the image information is set at one of these pixels, the image information of the pixel to be generated is likewise set.

According to a second variant, for the purpose of generating the image information of a pixel in the column (n) and the line (m), the image information suitable for positive image generation of five adjacent pixels is fed to the OR logic combining means. The pixel to be generated lies at the point of intersection of the pixels which are arranged in a cross shape and are logically combined with one another.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
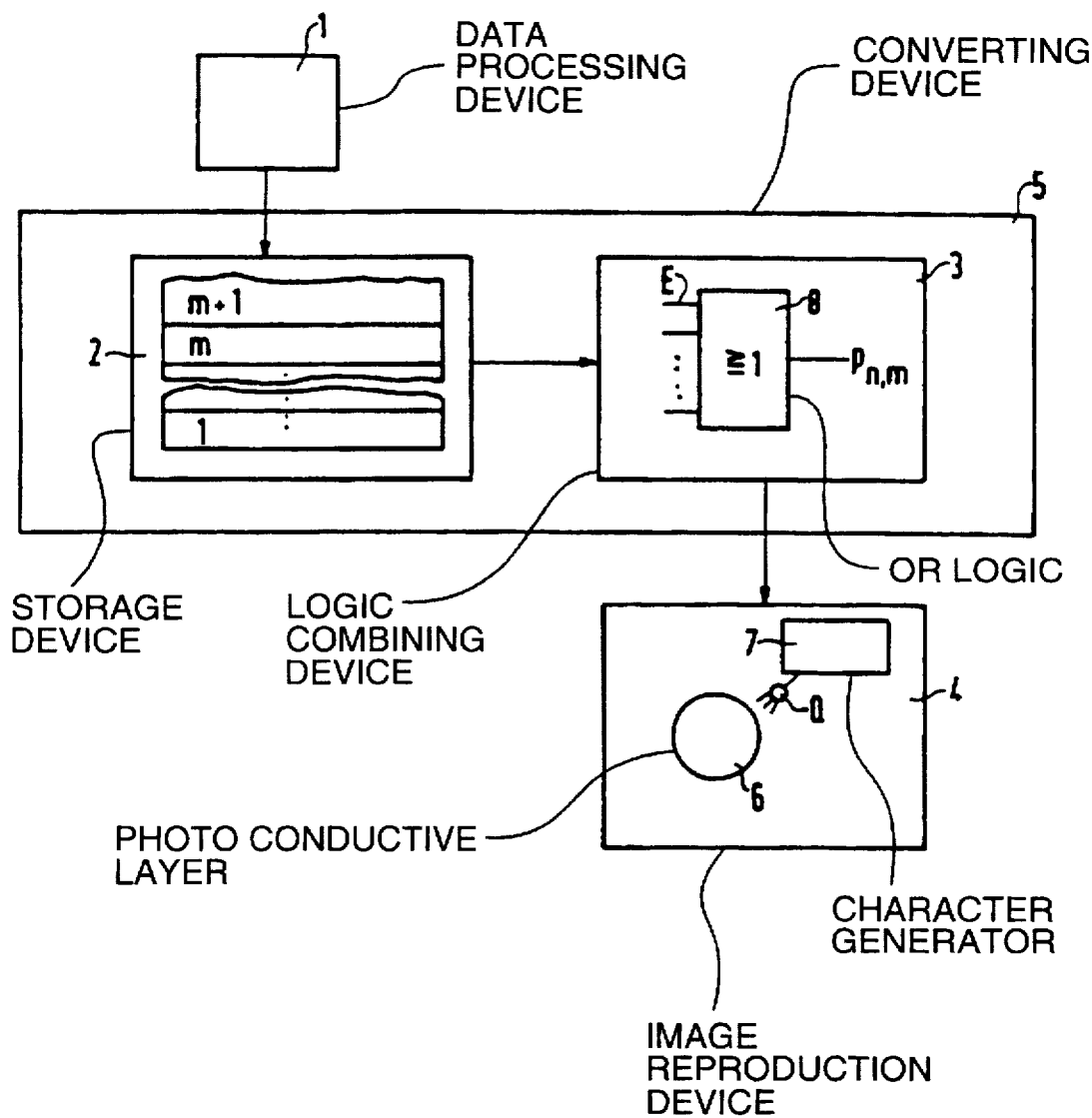
FIG. 1 shows a block diagram of the system for converting image information.

According to FIG. 1, a data processing device 1 transmits binary image information in matrix form and processed for positive image generation to a converting device 5. The converting device 5 contains a storage device 2, whose size is dimensioned such that at least the image information from two complete image lines m can be written in. Each individual item of image information is assigned to a pixel P of the matrix. The image information stored in the storage device 2 is read out as required by a logic combining means 3.

The logic combining means 3 contains—apart from control means which are not shown—depending on the required processing speed, one or more OR logic combining means 8 which are realized in an ASIC module and whose inputs E can randomly access by means of known control techniques the image information stored in the storage device 2. Maximum processing speed for generating the image information of a line m is achieved if each pixel P of one line m is assigned one logic combining means 8.

According to the first exemplary embodiment, an OR logic combining means 8 has four inputs E. Each input E is fed with the image information suitable for positive image generation of one pixel P in each case. The image information which is generated by the OR logic combining means and is suitable for inverse image generation of the pixels P of a line m is fed directly or via a buffer store, not shown, to a character generator 7.

The character generator 7 has a controllable light source Q, using which a photoconductive layer 6 is exposed at the pixels P at which the image information is not set. It goes without saying that, in the case of using a character generator 7 which exposes the photoconductive layer 6 at the pixels P having set image information, the output information from the logic combining means 3 must be inverted before it is fed to such a character generator 7.

Figure 2:
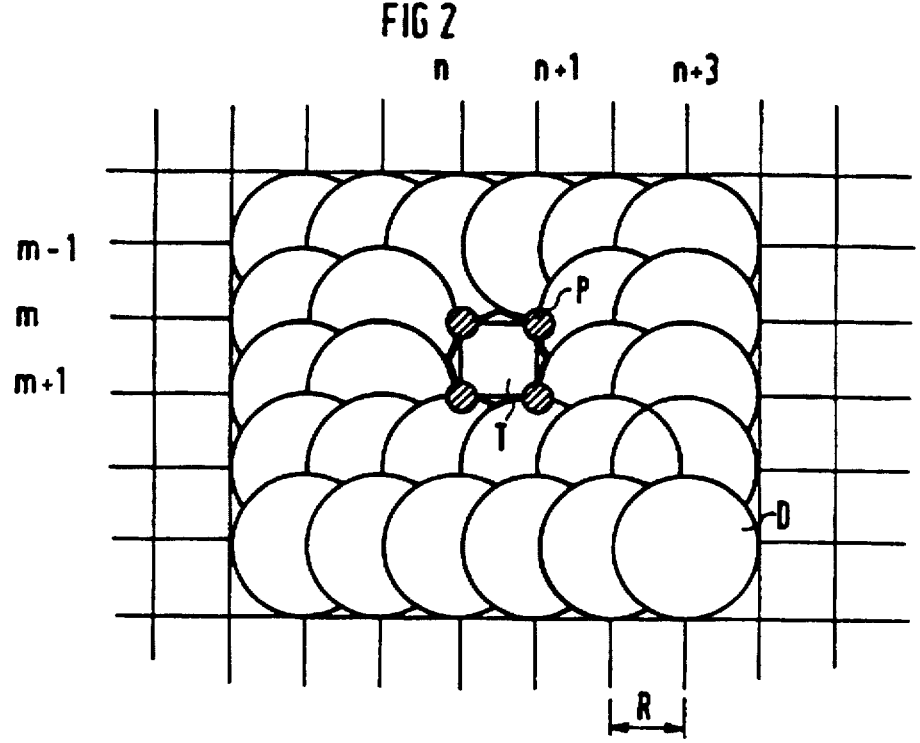
FIG. 2 shows a matrix with an inverse toner point, generated from four pixels with set image information, on a photosensitive layer.

FIG. 2 shows a matrix with an inverse toner point T, generated from four pixels P with set image information, on a photosensitive layer 6. The matrix comprises columns n and lines m. Each point of intersection of a line m with a column n represents a pixel P. On the photosensitive layer 6 it is intended, according to the image information suitable for positive image generation and originating from the data processing device 1, to image a toner point T only at the pixel $P_{m,n}$ in the line m and the column n.

If this image information were now to be passed directly to the character generator 7 without the interposition of the converting device 5, the character generator 7 would expose all the pixels P of the matrix with the exception of the pixel $P_{m,n}$, using a cone of light of diameter D. In the case of a given degree of overlap of two, however, this type of exposure would lead to the photosensitive layer 6 being completely discharged and hence no toner point T would be imaged.

The converting device 5, connected in between the data processing device 1 and the character generator 7, ensures, however, that the toner point T is reliably imaged at the pixel $P_{m,n}$. In order to generate this toner point T, the lines m and m+1 are stored in the storage device 2. Firstly, the image information suitable for inverse image generation of the pixels P of the line m+1 is now generated. In order to generate the image information of each pixel P of this line m+1, the logic combining means 3 logically combines the image information of a quad block of pixels P. A quad block contains four pixels P which form a rectangle and are directly adjacent. For example, the image information of the pixel $P_{m+1,n+3}$ is generated by means of ORing the image information of this pixel $P_{m+1,n+3}$ with the image information of the pixels $P_{m+1,n+2}$, $P_{m,n+2}$ and $P_{m,n+3}$. Since no image information of these four pixels $P_{m+1,n+2}$, $P_{m,n+2}$, $P_{m,n+3}$, $P_{m+1,n+3}$ was set, the image information suitable for inverse image generation at the pixel $P_{m+1,n+3}$ is also not set.

If the generation of the image information of the pixel $P_{m+1,n+1}$ is considered, the result of the ORing of the image information of the pixels $P_{m+1,n}$, $P_{m,n}$, $P_{m,n+1}$ and $P_{m+1,n+1}$ is a setting of the image information suitable for inverse image generation of the pixel $P_{m+1,n+1}$. This setting is carried out since the image information suitable for positive image generation at the pixel $P_{m,n}$ is set. All the pixels P of the line m+1 are treated in the same way. The result of the logic combining process is the set image information suitable for inverse image generation of the pixels $P_{m+1,n}$ and $P_{m+1,n+1}$. The image information suitable for inverse image generation of the line m+1 has thus been generated and can be output to the character generator 7.

In order to generate the image information suitable for inverse image generation of the pixels P of the line m, the image information suitable for positive image generation of the line m-1 must now be written into the storage device 2. The image information for line m+1 can be overwritten in the process, since it is no longer needed. The image information of the individual pixels P of the line m is generated by means of the above-described logic combining in each case of one quad block of pixels P. After completing the logic combining process, the pixels $P_{m,n+1}$ and $P_{m,n}$ are set. In the case of the generation of image information suitable for inverse image generation of the following line m-1, the result is that no image information of a pixel P is set.

Now, it can be seen in FIG. 2 that, as the result of the exposure process of the character generator 7 on the photosensitive layer 6, a toner point T constructed as an octagonal field (see thick border) remains unexposed, the corners of which field are marked by the pixels $P_{m+1,n}$, $P_{m+1,n+1}$, $P_{m,n}$ and $P_{m,n+1}$, whose image information was set in the generation process. At this toner point T, the charge on the photosensitive layer 6 is maintained. This charged area is inked with toner in a process arranged after the exposure process. The toner is subsequently transferred to a recording substrate, not shown.

The inversely generated toner point T does not coincide exactly with a toner point T which is generated positively for a corresponding pixel $P_{n,m}$. Since the small local deviation for each toner point T is the same, it is inconsequential for the quality of the image reproduction. Any disturbing local displacement of the transferred image on the recording substrate can be compensated for by means of an offset.

Figure 3:
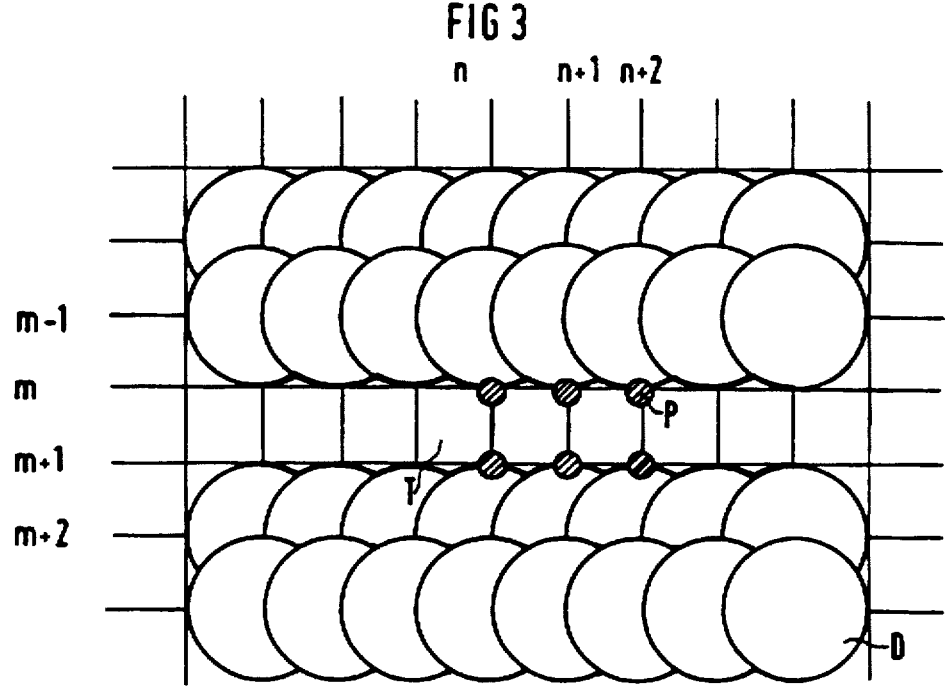
FIG. 3 shows a matrix with an image line made of toner points according to FIG. 1.
Figure 4:
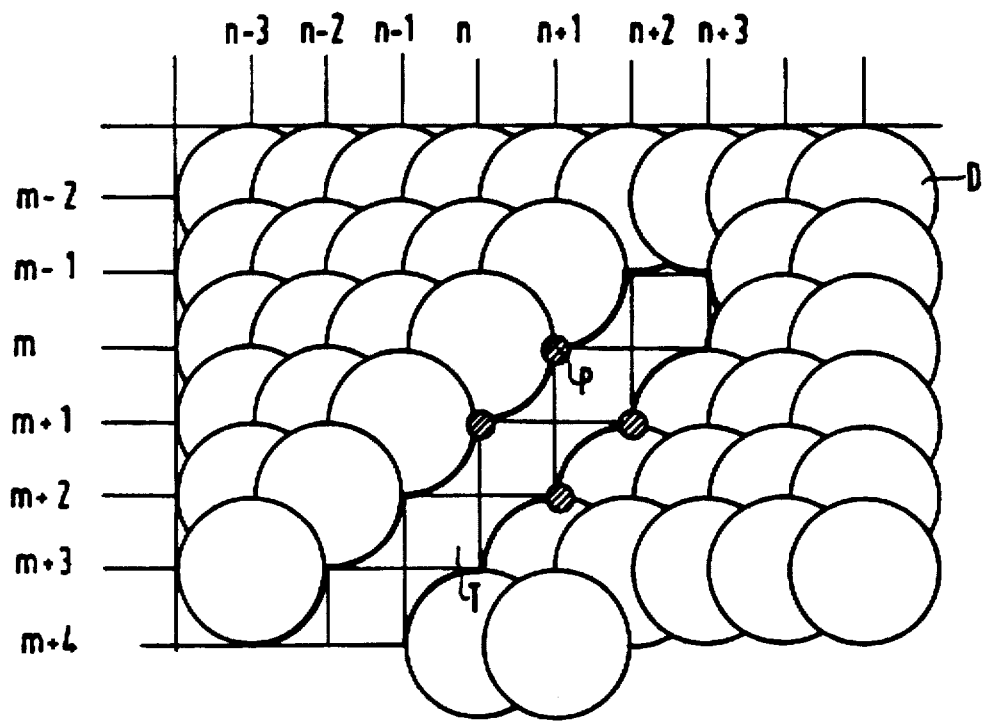
FIG. 4 shows a matrix with a diagonal made of toner points according to FIG. 1

The generation of a straight line according to FIG. 3 and of a diagonal according to FIG. 4 is based on the same quad block logic as was represented in order to generate the toner point T at the pixel $P_{m,n}$.

In the image information suitable for positive image generation for a line according to FIG. 3, all the image information of the pixels P of the line m is set. A logic combining of the image information of the pixels P of the lines m+1 and m results in the setting of all the image information of the pixels P of the line m+1. A logic combining of the image information of the pixels P of the lines m and m-1 has the result that all the image information of the pixels P of the line m remains set. As a result, as shown in FIG. 3, an unexposed area is produced (see thick border) on the photosensitive layer 6. This unexposed area comprises a lined-up row of toner points T and is marked by the interspace between the pixels P of the lines m and m+1.

The generation of the diagonal according to FIG. 4 is based on the image information suitable for positive image generation, according to which the image information of the following pixels P is set: $P_{m+4,n-3}$, $P_{m+3,n-2}$, $P_{m+2,n-1}$, $P_{m+1,n}$, $P_{m,n+1}$ and $P_{m-1,n+1}$. The image information suitable for inverse image generation of the pixels P of the lines m+4, m+3 ... down to m-2 is successively generated by applying the quad block logic. In the case of this generation, in addition to the image information which is set and which is suitable for positive image generation, the image information of the pixels $P_{m+4,n-1}$, $P_{m+3,n}$, $P_{m+2,n+1}$, $P_{m+1,n+2}$, $P_{m,n+3}$ and $P_{m-1,n+3}$ is set. These pixels $P_{m+4,n-1}$, $P_{m+3,n}$, $P_{m+2,n+1}$, $P_{m+1,n+2}$, $P_{m,n+3}$ and $P_{m-1,n+3}$ and the pixels $P_{m+4,n-3}$, $P_{m+3,n-2}$, $P_{m+2,n-1}$, $P_{m+1,n}$, $P_{m,n+1}$, $P_{m-1,n+1}$, whose image information was already set for positive image generation, respectively form a diagonal. Between these two diagonals, an unexposed area is produced (see thick border) on the photosensitive layer 6. This unexposed area comprises a lined-up row of toner points T which are inked in as image information and are transferred to a recording substrate.

Figure 5:
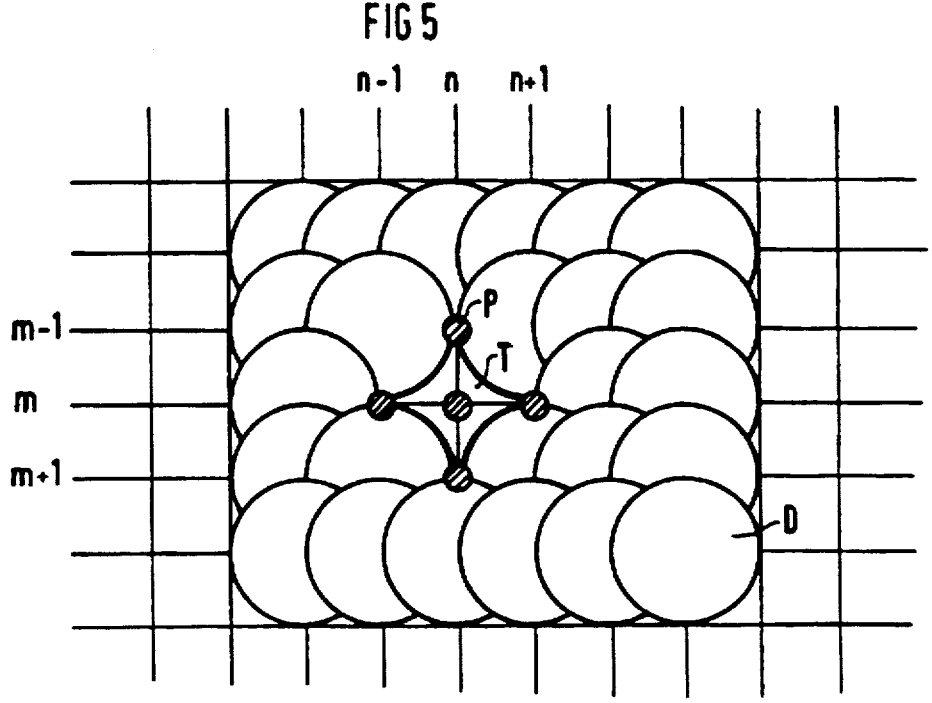
FIG. 5 shows a matrix with an inverse toner point, generated from five pixels with set image information, on a photosensitive layer.

According to a second exemplary embodiment, which is shown in FIG. 5, instead of the image information suitable for positive image generation of four pixels P, the image information of five pixels P is logically combined. The storage device 2 has, for this purpose, storage space for accommodating three lines m of a matrix. It is intended to produce a toner point T at the pixel $P_{m,n}$ at the point of intersection of the lines m and of the column n. Since the diameter D of a cone of light, just as in the case of the first exemplary embodiment, is twice as large as the grid size R, this toner point T would not be imaged on the photosensitive layer 6 without the interposition of the converting device 5. In order to generate the image information suitable for inverse image generation of this pixel $P_{m,n}$, the (m+2)th, the (m+1)th, the (m)th, the (m−1)th and the (m−2)th image lines are needed. The image information, to be logically combined in the logic combining means 3, of the pixels P is arranged on the matrix in a cross shape. Thus, for example, the pixels $P_{m+1,n}$, $P_{m,n-1}$, $P_{m,n}$, $P_{m,n+1}$ and $P_{m-1,n}$ form such a cross.

Firstly, the image information suitable for inverse image generation of the pixels P of the line m+1 is generated. In order to generate the image information of these pixels P, the image information suitable for positive image generation of the lines m, m+1 and m+2 is needed. In all these lines, only the image information of the pixel $P_{m,n}$ is set. Consequently, only the ORing for generating the image information of the pixel $P_{m+1,n}$ produces a result, according to which this image information is set. In order to generate the image information of the pixel $P_{m+1,n}$, the following pixels P are fed to the OR logic combining means 3: $P_{m+2,n}$, $P_{m+1,n-1}$, $P_{m+1,n}$, $P_{m+1,n+1}$ and $P_{m,n}$.

In order to generate the image information suitable for inverse image generation of the pixels P of the line m, in addition the line m−1 is written into the storage device 2. In this case, the line m+2 can be overwritten. The image information suitable for positive image generation of the three lines m−1, m, m+1 remaining in the storage device 2 is logically combined successively, in groups to form five pixels P which are arranged in a cross. Thus, for example, the image information of the pixel $P_{m,n+1}$ is generated by means of the ORing of the image information of the pixels $P_{m+1,n+1}$, $P_{m,n}$, $P_{m,n+1}$, $P_{m,n+2}$ and $P_{m-1,n+1}$. After executing all the logic combining operations between the lines m−1, m and m+1, the image information of the pixels $P_{m,n-1}$, $P_{m,n}$ and $P_{m,n+1}$ is set. The generation of the image information suitable for inverse image generation of the pixels P of the line m−1 from the image information suitable for positive image generation of the image lines m−2, m−1 and m results in image information which is set for the pixel $P_{m-1,n}$.

The converting device 5 therefore generates, from a set image information item for the pixel $P_{m,n}$, five set image information items for the pixels $P_{m,n-1}$, $P_{m,n}$, $P_{m,n+1}$, $P_{m+1,n}$ and $P_{m-1,n}$ which are arranged in a cross shape. The pixels P surrounding the point of intersection $P_{m,n}$ mark the corner points of a rhombus, which corresponds to the toner point T. The area of this rhombus is not exposed on the photosensitive layer 6 and is consequently not discharged. Toner particles can be deposited on the rhombus area and can be transferred to a recording substrate as a visible image point.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A system for converting first image information in matrix form and for positive image generation into second image information for inverse image generation for an electrographic printer or copier, the system comprising:
   a data processing device coupled to a converting device;
   the converting device having a storage device for storing at least two consecutive lines of the first image information suitable for positive image generation;
   the converting device also having a logic combining device which is coupled to the storage device and logically ORs the first image information suitable for positive image generation of a first pixel with at least one further item of first image information of an adjacent pixel in order to generate an item of second image information suitable for inverse image generation of said first pixel; and
   an image reproduction device coupled to the converting device.

2. The system for converting image information as claimed in claim 1, wherein the first image information suitable for positive image generation is communicated line by line to the converting device and the second image information suitable for inverse image generation is output line by line by the converting device, and wherein first image information which is in the storage device and which is no longer needed is overwritten line by line.

3. The system for converting image information as claimed in claim 1, wherein the image reproduction device is
   a character generator having at least one controllable light source which generated image information is transmitted onto a surface of a photosensitive layer, and wherein a diameter of a light beam incident on the photosensitive layer is set such that the diameter is greater than the spacing of two pixels from each other.

4. The system for converting image information as claimed in claim 1, wherein the logic combining device, in order to generate second image information of a second image pixel in a column n and a line m, logically combines first image information suitable for positive image generation, the first image information having
   a first image pixel $P_{n-1,m}$ in column n−1 and line m,
   a first image pixel $P_{n-1,m-1}$ in column n−1 and line m−1,
   a first image pixel $P_{n,m-1}$ in column n and line m−1, and
   a first image pixel $P_{n,m}$ in column n and line m.

5. The system for converting image information as claimed in claim 1, wherein the logic combining device, in order to generate second image information of a second image pixel $P_{n,m}$ in a column n and a line m, logically combines first image information suitable for positive image generation, the first image information having
   a first image pixel $P_{n,m-1}$ in column n and line m−1,
   a first image pixel $P_{n-1,m}$ in column n−1 and line m,
   a first image pixel $P_{n,m}$ in column n and line m,
   a first image pixel $P_{n+1,m}$ in column n+1 and line m, and
   a first image pixel $P_{n,m+1}$ in column n and line m+1.

6. A process for converting first image information in matrix form and suitable for positive image generation into second image information suitable for inverse image generation for an electrographic printer or copier, the process comprising the steps of:
   providing a data processing device coupled to a logic combining device and to a converting device having a storage device;
   transmitting via the data processing device first image information suitable for positive image generation to the storage device in the converting device;
   reading via a logic combining device, which is coupled to the storage device and contained in the converting device, the first image information suitable for positive image generation of a first pixel and at least one further item of first image information of an adjacent pixel from the storage device;
   performing a logical OR operation via the logic combining device on the items of first image information in order to generate an item of second image information for inverse image generation of the first pixel; and
   outputting via the converting device the generated second image information to an image reproduction device.

7. The process for converting image information as claimed in claim 6, wherein the first image information suitable for positive image generation is communicated line by line to the converting device and wherein the second image information suitable for inverse image generation is output line by line to the image reproduction device, and wherein first image information, which is in the storage device and which is no longer needed is overwritten line by line.

8. The process for converting image information as claimed in claim 6, wherein transmitting from the data processing device to the storage device first image information suitable for positive image generation of lines m−1 and m;

logically combining via the logic combining device, in order to generate second image information suitable for inverse image generation of second image pixels $P_{n,m}$ of the line m, first image information stored in the storage device, the first image information having a first image pixel $P_{n-1,m}$ in column n−1 and line m, a first image pixel $P_{n-1,m-1}$ in column n−1 and line m−1, a first image pixel $P_{n,m-1}$ in column n and line m, and a first image pixel $P_{n,m}$ in column n and line m.

where m=constant and n ∈ N;

transmitting from the data processing device first image information suitable for positive image generation of a following line m−2 to the storage device for subsequent generation of second image information suitable for inverse image generation of pixels of the m−1th line.

9. The process for converting image information as claimed in claim 6, wherein the process further comprises:

transmitting from the data processing device to the storage device first image information suitable for positive image generation of lines m−1, m and m+1;

logically combining via the logic combining device, in order to generate second image information suitable for inverse image generation of the second image pixels $P_{n,m}$ of the line m, first image information stored in the storage device of, the first image information having a first image pixel $P_{n,m-1}$ in column n and line m−1, a first image pixel $P_{n-1,m}$ in column n−1 and line m, a first image pixel $P_{n,m}$ in column n and line m, a first image pixel $P_{n+1,m}$ in column n+1 and line m, and a first image pixel $P_{n,m+1}$ in column n and line m+1 where m=constant and n ∈ N;

transmitting from the data processing device first image information suitable for positive image generation of a following line m−2 to the storage device for subsequent generation of second image information suitable for inverse image generation of the m−1 th line.

* * * * *